United States Patent
Kogure et al.

(10) Patent No.: US 12,086,585 B2
(45) Date of Patent: Sep. 10, 2024

(54) PROGRAM UPDATE SYSTEM, VEHICLE CONTROL DEVICE, AND PROGRAM UPDATE METHOD

(71) Applicant: Hitachi Astemo, Ltd., Hitachinaka (JP)

(72) Inventors: Yusuke Kogure, Ibaraki (JP); Takaaki Nokaido, Ibaraki (JP); Kentaro Yoshimura, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 90 days.

(21) Appl. No.: 17/908,502

(22) PCT Filed: Jan. 15, 2021

(86) PCT No.: PCT/JP2021/001177
§ 371 (c)(1),
(2) Date: Aug. 31, 2022

(87) PCT Pub. No.: WO2021/199575
PCT Pub. Date: Oct. 7, 2021

(65) Prior Publication Data
US 2023/0098588 A1    Mar. 30, 2023

(30) Foreign Application Priority Data

Mar. 30, 2020   (JP) ................. 2020-060932

(51) Int. Cl.
*G06F 9/44*     (2018.01)
*G06F 8/65*     (2018.01)
*B60R 16/023*   (2006.01)

(52) U.S. Cl.
CPC ............ *G06F 8/65* (2013.01); *B60R 16/0231* (2013.01)

(58) Field of Classification Search
None
See application file for complete search history.

(56) References Cited

U.S. PATENT DOCUMENTS

2019/0265965 A1\* 8/2019 Acharya ................... G06F 8/65
2021/0157492 A1\* 5/2021 Harata ...................... G06F 8/65
(Continued)

FOREIGN PATENT DOCUMENTS

| JP | 2018-079768 A   | 5/2018 |
| JP | 2020-027639 A   | 2/2020 |
| WO | WO 2019/038855 A1 | 2/2019 |

OTHER PUBLICATIONS

International Search Report with English Translation and Written Opinion in International Application PCT/JP2021/01177 mailed May 18, 2021.

*Primary Examiner* — Qamrun Nahar
(74) *Attorney, Agent, or Firm* — Foley & Lardner LLP (57) ABSTRACT

Updating of a program is realized even with a small-sized temporary storage area. A program update system distributes an update program from an update program distributing unit to a vehicle control device. The update program distributing unit encrypts an update program by a predetermined unit of encryption, and transmits the update program, which has been encrypted, by a predetermined unit of transfer to the vehicle control device to be updated, the vehicle control device decrypts the received update program by the unit of encryption, and stores the update program, which has been decrypted, by a predetermined unit of writing in a program storage unit, and the unit of writing is an integral multiple of the unit of encryption.

7 Claims, 5 Drawing Sheets

(56) References Cited

U.S. PATENT DOCUMENTS

2022/0342652 A1* 10/2022 Ishikawa .................. G06F 8/65
2024/0015013 A1* 1/2024 Sumiya .................... G06F 8/65

* cited by examiner

RECOMMENDED VALUES OF ENCRYPTION, WRITING, AND Resume SIZES FOR TRANSFER SIZE OF COMMUNICATION PATH

| | TRANSFER SIZE | ENCRYPTION SIZE | WRITING SIZE | Resume SIZE | EXAMPLE | LIMITING CONDITION | MERIT | DEMERIT |
|---|---|---|---|---|---|---|---|---|
| 1 | a | a*m | a*m*n | a*m*n*k | a=8byte<br>a*m=16byte<br>a*m*n=256byte<br>a*m*n*k=16kbyte | • "m", "n", "k" ARE INTEGERS<br>• CODE SIZE CAN BE DESIGNATED FOR BLOCK CYPHER<br>• WRITING SIZE CAN BE DESIGNATED BY SPECIFICATION OF ECU | IN RECEIVING DATA, DECRYPTION, AND WRITING, FIRST STORAGE UNIT AND SECOND STORAGE UNIT REQUIRE MINIMUM USAGE OF RAM AND MINIMUM READING PROCESS, RESULTING IN LESS AMOUNT OF RESOURCES | NUMBER OF TIMES OF COMMUNICATION IS LARGE, RESULTING IN LOW COMMUNICATION SPEED |
| 2 | a | a/m | a/m*n | a/m*n*k | a=1280byte<br>a/m=16byte<br>a/m*n=256byte<br>a/m*n*k=16kbyte | • "m", "n", "k" ARE INTEGERS<br>• CODE SIZE CAN BE DESIGNATED FOR BLOCK CYPHER<br>• WRITING SIZE CAN BE DESIGNATED BY SPECIFICATION OF ECU | NUMBER OF TIMES OF COMMUNICATION IS SMALL, RESULTING IN HIGH COMMUNICATION SPEED | LARGE PROCESS OF READING CIPHERTEXT FROM RECEIVED DATA AND LARGE USAGE OF RAM IN FIRST STORAGE UNIT ARE REQUIRED, RESULTING IN MIDDLE AMOUNT OF RESOURCES |

PROGRAM UPDATE SYSTEM, VEHICLE CONTROL DEVICE, AND PROGRAM UPDATE METHOD

TECHNICAL FIELD

The present invention relates to a program update system, and a vehicle control device that can update a program.

BACKGROUND ART

In recent years, as a program update method for an electronic control unit (ECU) of a vehicle, an online update function of downloading a program wirelessly distributed from a program distribution center over a network and updating a program of an ECU has been put into practical use. In addition, from a viewpoint of improving security, a technique of encrypting and distributing an update program and downloading the update program to a vehicle control device has been put into practical use.

JP 2018-79768 A is a background art of the technical field (PTL 1). JP 2018-79768 A describes an update data storing system including a data dividing unit that divides update data for updating pieces of predetermined data stored in a plurality of devices provided in a vehicle, capable of storing data therein, and included in a system other than a traveling system and in a predetermined device mounted on the vehicle into a plurality of pieces of divided data, an associating unit that associates each of the plurality of pieces of divided data with one of the plurality of devices as a storage in which the piece of divided data is stored, and a storage processing unit that stores each of the plurality of pieces of divided data in a device, among the plurality of devices, that is associated with the piece of divided data by the associating unit (see claim 1).

CITATION LIST

Patent Literature

PTL 1: JP 2018-79768 A

SUMMARY OF INVENTION

Technical Problem

With vehicle control devices becoming more multifunctional, the sizes of update programs for vehicle control devices are becoming larger. Thus, there is a problem that a large storage area is required to temporarily store an update program in a vehicle control device halfway during download.

In a known method for avoiding such a problem, an update program is divided and stored in a plurality of vehicle control devices so that each vehicle control device has a smaller storage area for temporary storage as in the above-described conventional technique.

However, this method has a disadvantage that a vehicle control device in which a program is to be updated needs a large storage area for temporarily storing encrypted program data that has been decrypted. In so-called public key encryption, a decryption process can be executed only in a vehicle control device that is targeted for program update. Thus, it is necessary to store an encrypted program data in a temporary storage area of a vehicle control device targeted for update, execute a decryption process, store the decrypted program data in the temporary storage area, and then write the decrypted program data in a non-volatile memory.

The present invention has been made in view of the above-described problem, and an object of the present invention is to realize update of a program even with a small-sized temporary storage area in a series of processes from encryption to writing in a program memory by dividing update program data by a predetermined unit

Solution to Problem

A representative example of the invention disclosed in the present application is as follows. That is, a program update system distributes an update program from an update program distributing unit to a vehicle control device, the update program distributing unit encrypts an update program by a predetermined unit of encryption, and transmits the update program, which has been encrypted, by a predetermined unit of transfer to the vehicle control device to be updated, the vehicle control device decrypts the received update program by the unit of encryption, and stores the update program, which has been decrypted, by a predetermined unit of writing in a program storage unit, and the unit of writing is an integral multiple of the unit of encryption.

Advantageous Effects of Invention

According to the present invention, the size of a temporary storage area required in a vehicle control device targeted for update can be reduced. Problems, configurations, and effects other than those described above will be clarified by the following description of embodiments.

DESCRIPTION OF EMBODIMENTS

An embodiment of the present invention will be described with reference to FIGS. 1 to 5.

Figure 1:
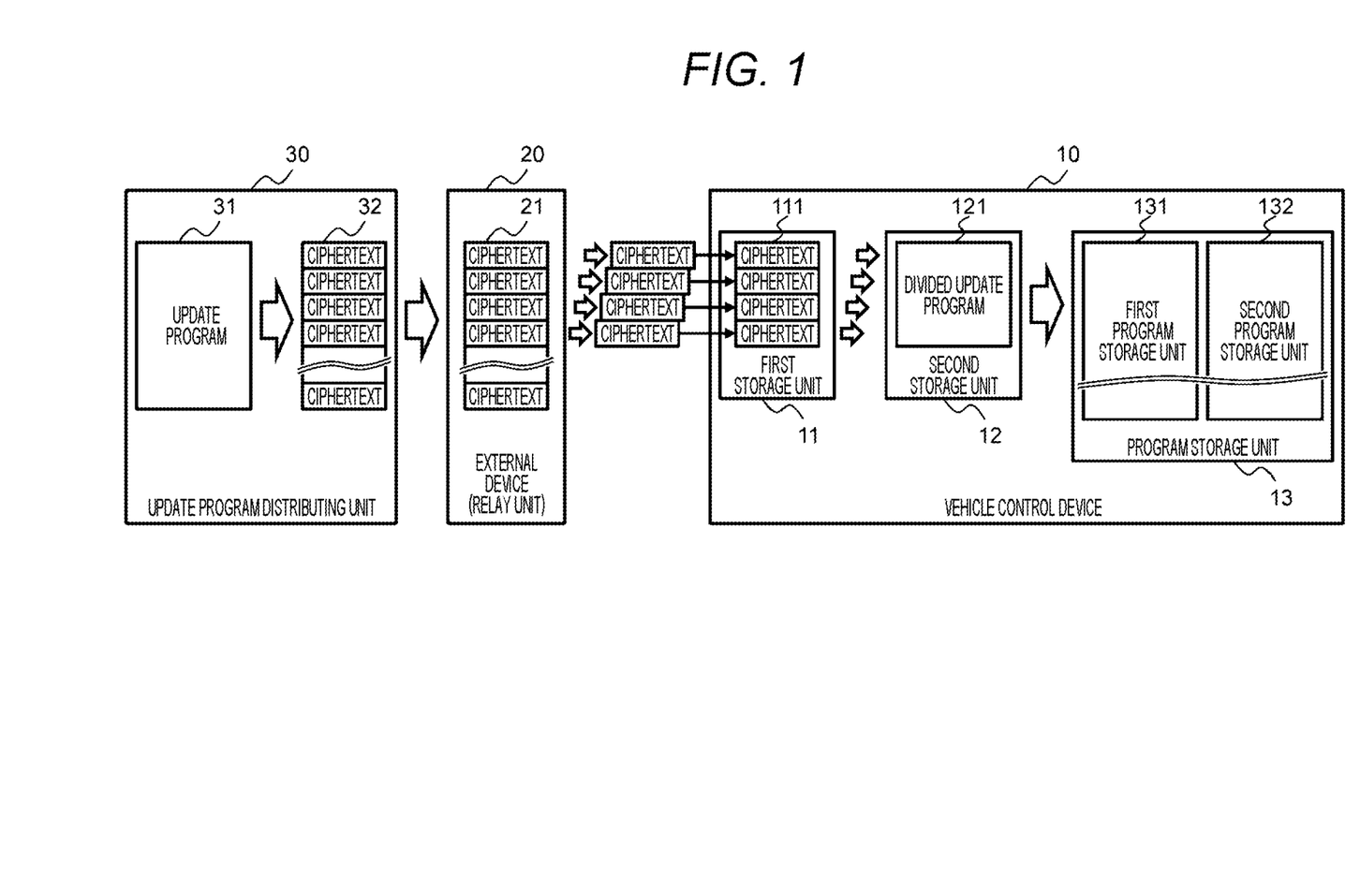
FIG. 1 is a configuration diagram of a program update system of an embodiment of the present invention.
Figure 2:
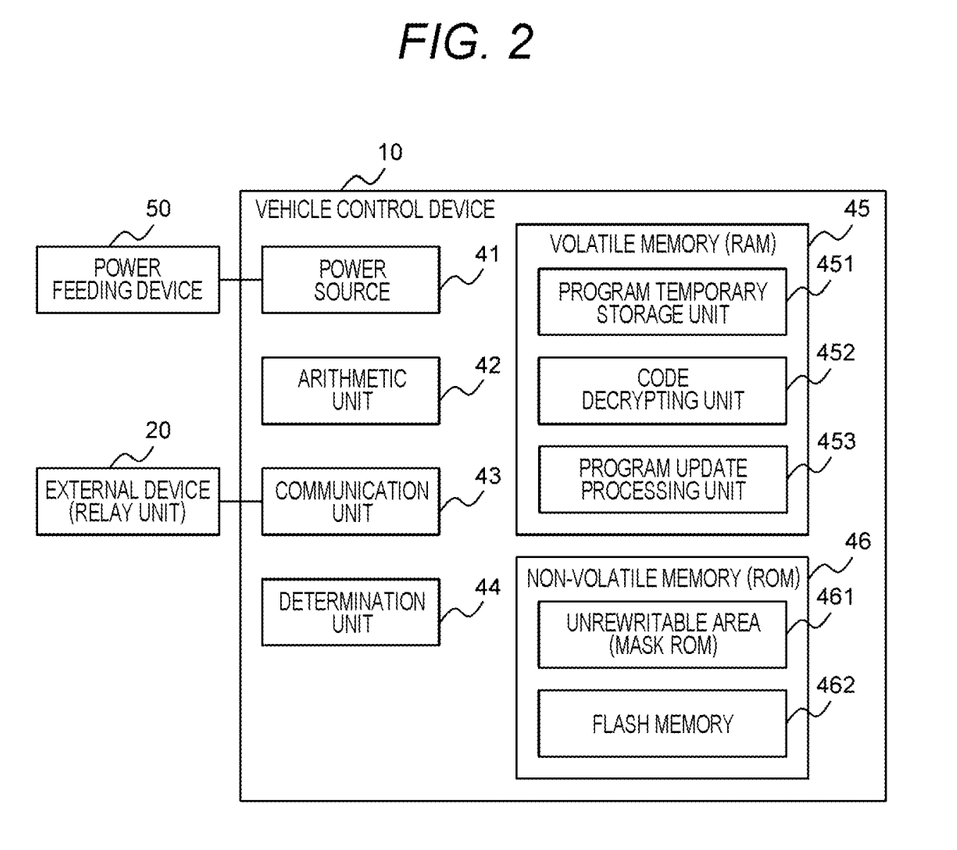
FIG. 2 is a configuration diagram of a vehicle control device of the present embodiment.

FIG. 1 is a configuration diagram of a program update system of the present embodiment, and FIG. 2 is a configuration diagram of a vehicle control device 10 of the present embodiment.

The program update system illustrated in FIG. 1 includes an update program distributing unit 30 that distributes a program, a relay unit 20 that relays the program distributed from the update program distributing unit 30, and the vehicle control device 10 that receives the distributed program.

The vehicle control device 10 includes a first storage unit 11, a second storage unit 12, and a program storage unit 13. The first storage unit 11 and the second storage unit 12 are storage areas provided in a volatile memory (RAM) 45 of the vehicle control device 10. The first storage unit 11 stores a ciphertext 111 of an update program, and the second storage unit 12 stores a decrypted divided update program.

The program storage unit 13 includes a first program storage unit 131 and a second program storage unit 132.

The relay unit 20 includes a ciphertext storage unit 21. The update program distributing unit 30 stores in a storage device an update program 31 to be updated and ciphertexts 32 resulting from dividing and encrypting the update program 31.

The update program distributing unit 30 transmits the ciphertexts 32 to the relay unit 20. The relay unit 20 stores the received ciphertexts in a memory (ciphertext storage unit 21) and transmits the ciphertexts to the vehicle control device 10. The vehicle control device 10 receives divided and encrypted ciphertexts 111, stores the ciphertexts 111 in the first storage unit 11, decrypts codes by a predetermined unit to reconstruct an update program 121, and stores the update program 121 in the second storage unit 12. The vehicle control device 10 selects a program storage area of the program storage unit 13, among the first program storage unit 131 and the second program storage unit 132 of the program storage unit 13, that is on standby (with no program operating therein), and writes the update program 121 in the selected program storage area to update the program.

As illustrated in FIG. 2, the vehicle control device 10 includes a power source 41, an arithmetic unit 42, a communication unit 43, a determination unit 44, a volatile memory 45, and a non-volatile memory 46. The volatile memory 45 includes a program temporary storage unit 451, a code decrypting unit 452, and a program update processing unit 453, and the non-volatile memory 46 includes an unrewritable area 461 constituted by a mask ROM, and a flash memory 462 in which data is rewritable. The power source 41 is connected to the power feeding device 50, and the communication unit 43 is connected to the relay unit 20 which is an external device.

Figure 3:
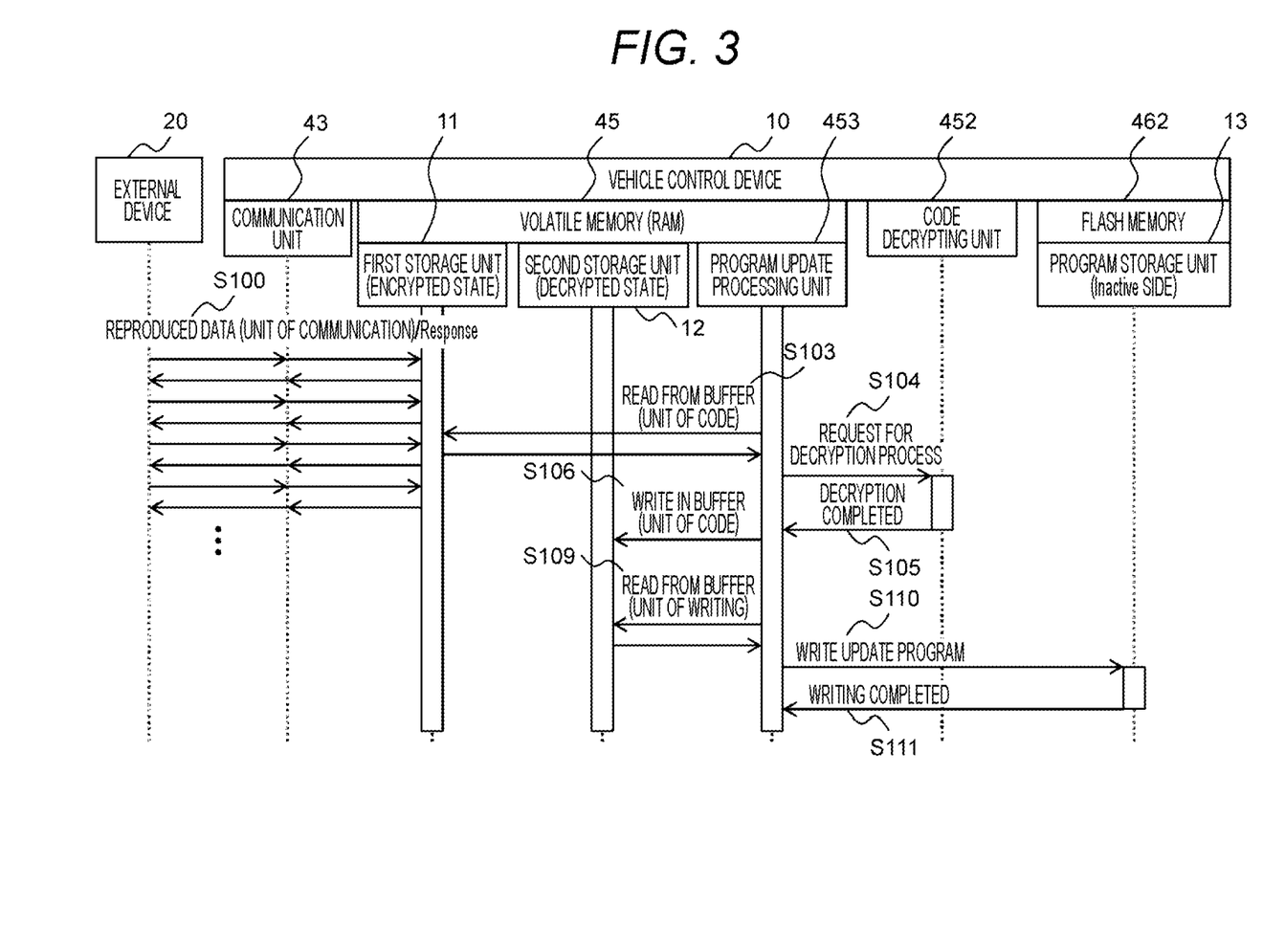
FIG. 3 is a time chart of a program update process of the present embodiment.

FIG. 3 is a time chart of a program update process of the present embodiment.

The external device 20 transfers to the vehicle control device 10 reproduced data (ciphertext) transmitted from the update program distributing unit 30 after being divided and encrypted by a unit of communication (S100).

The vehicle control device 10 stores the received ciphertext as it is in an encrypted state in the first storage unit 11. The program update processing unit 453 monitors the amount of reproduced data stored in the first storage unit 11, and when the amount of stored data reaches a unit of decryption process performed by the code decrypting unit 452 reads encrypted data buffered in the first storage unit 11 by the unit of decryption process (S103) and requests the code decrypting unit 452 to perform decryption process (S104). The code decrypting unit 452 decrypts the ciphertext transmitted from the update program distributing unit 30 and returns the decrypted ciphertext to the program update processing unit 453 (S105). As described above, as soon as the reproduced data is accumulated to the unit of the decryption process, the code decrypting unit 452 decrypts the received reproduced data by streaming. The program update processing unit 453 stores the decrypted reproduced data in the second storage unit 12 by a unit of encryption (S106). The processes in steps S103 to S106 are executed every time the reproduced data (ciphertext) is transmitted from the update program distributing unit 30, and the decrypted reproduced data is accumulated in the second storage unit 12.

The program update processing unit 453 monitors the amount of reproduced data stored in the second storage unit 12, and when the amount of stored data reaches the unit of writing in the flash memory 462 constituting the program storage unit 13 reads the decrypted reproduced data from the second storage unit 12 (S109) and writes the decrypted reproduced data, which has been read, in the program storage unit 13 (S110). When writing of the reproduced data is completed, the program storage unit 13 gives a reply that writing has been completed to the program update processing unit 453 (S111). The processes in steps S109 to S111 are executed every time the amount of reproduced data stored in the second storage unit 12 reaches the unit of writing in the flash memory 462, and thereby the decrypted reproduced data is accumulated in the program storage unit 13.

Figure 5:
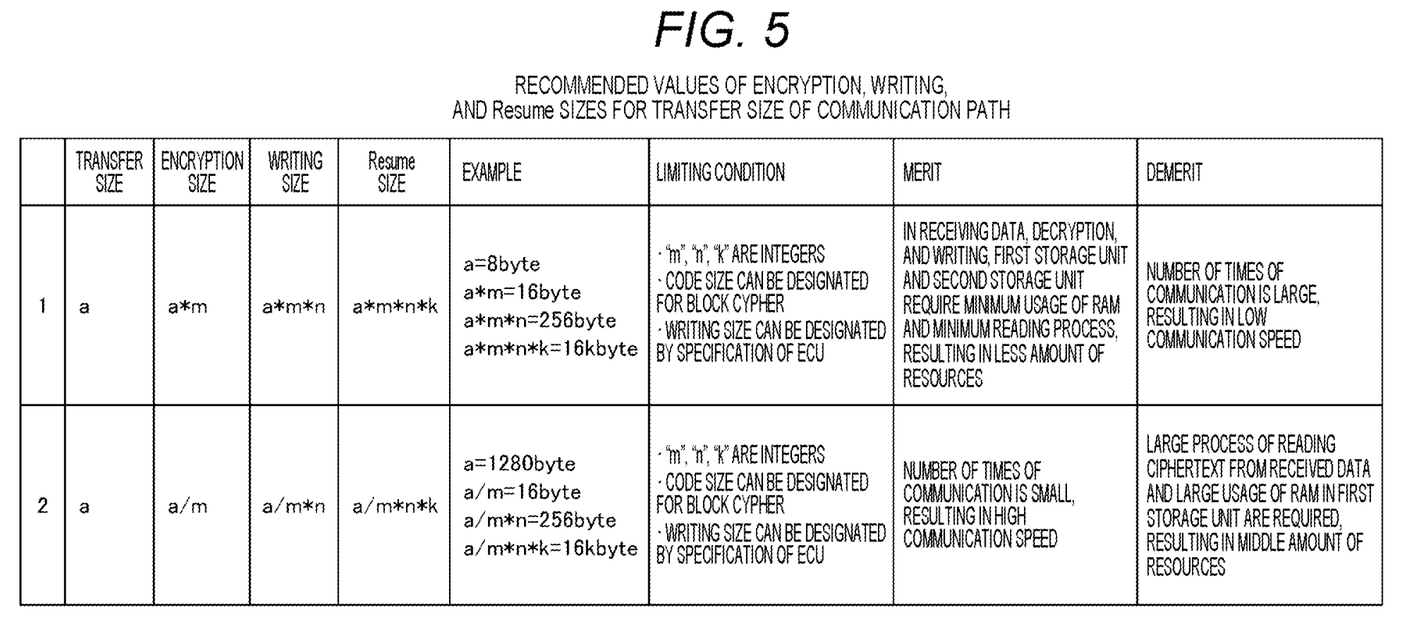
FIG. 5 illustrates examples of sizes in each process of the present embodiment.

Described with FIG. 3 is a case where the transfer size is smaller than the encryption size, but the transfer size may be larger than the encryption size as in pattern 2 in FIG. 5 described later. In this case, when a unit (for example, a packet or a frame) of reproduced data (ciphertext) is transferred, a plurality of ciphertexts are extracted from the transferred reproduced data, sequentially decrypted by the code decrypting unit 452, and stored in the second storage unit 12.

Figure 4:
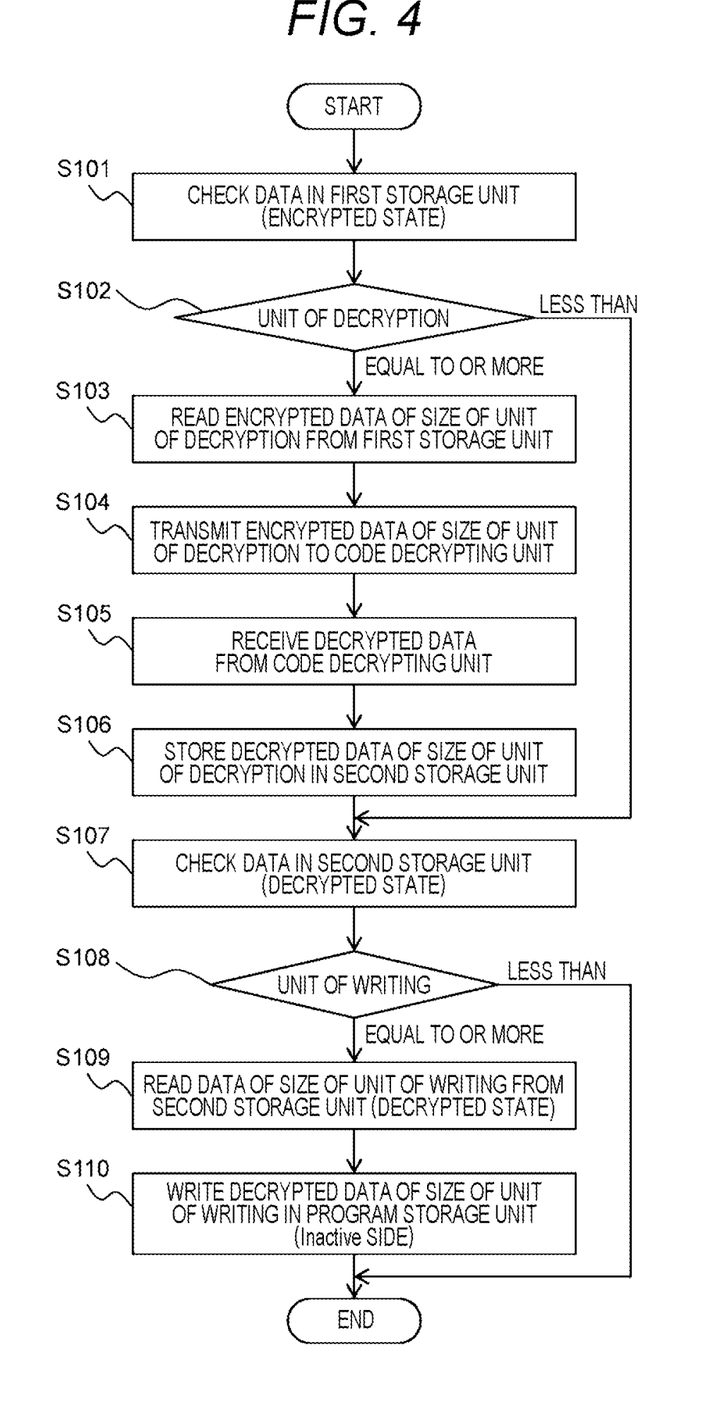
FIG. 4 is a flowchart of a process executed by a program update processing unit of the present embodiment.

FIG. 4 is a flowchart of a process executed by the program update processing unit 453.

The program update processing unit 453 first checks the amount of reproduced data stored in the first storage unit 11 (S101). In step S102, if the amount of reproduced data stored in the first storage unit 11 is less than the unit of the decryption process performed by the code decrypting unit 452, the process proceeds to step S107. If the amount of reproduced data stored in the first storage unit 11 is equal to or more than the unit of the decryption process performed by the code decrypting unit 452, the program update processing unit 453 reads encrypted data of a size of the unit of the decryption process from the first storage unit 11 (S103), and transmits the encrypted data, which has been read, to the code decrypting unit 452 (S104). The program update processing unit 453 receives the decrypted data from the code decrypting unit 452 (S105), and stores the decrypted data in the second storage unit 12 (S106).

Then, the program update processing unit 453 checks the amount of reproduced data stored in the second storage unit 12 (S107). In step S108, if the amount of reproduced data stored in the second storage unit 12 is less than the unit of writing in the program storage unit 13, the process is finished because writing data of a size less than the unit of writing results in poor efficiency in writing processes including the subsequent process. If the amount of reproduced data stored in the second storage unit 12 is equal to or more than the unit of writing in the program storage unit 13, the program update processing unit 453 reads encrypted data of a size of a unit of writing in the program storage unit 13 from the second storage unit 12 (S109), and writes the reproduced data in the program storage area on standby (with no program operating therein) among the first program storage unit 131 and the second program storage unit 132 of the program storage unit 13 to update the program.

Next, examples of the sizes in each process will be described. FIG. 5 illustrates recommended values of the transfer size of a communication path, the unit (size) of encryption and decryption, the unit (size) of writing in the flash memory 462, and Resume size of the program to be updated. Note that "a", "m", "n", and "k" are predetermined integers. The size of the communication path indicates an amount of data that can be transferred by a unit communication (for example, the payload size of a packet or a frame). The encryption size is a size that can be designated in block cipher, and the writing size is a size that can be designated by a specification of the vehicle control device 10 (that is, the unit of writing in the flash memory 462 constituting the program storage unit 13). The Resume size indicates a unit size by which the update of the program is regarded to be completed when update of the program stops halfway. Update of a portion of the program that has a size smaller than the Resume size is executed again.

For example, in pattern 1 in which the transfer size of the communication path is small as in CAN, the transfer size "a", the encryption size "a×m", and the writing size "a×m× n" are in integral multiple relationship among each other, and the transfer size is smaller than the encryption size. In this case, the Resume size may be "a×m×n×k". Specifically, the sizes are: transfer size "a"=8 bytes, encryption size "a×m"=16 bytes, writing size "a×m×n"=256 bytes, and Resume size "a×m×n×k"=16 kilobytes.

In pattern 1, the first storage unit 11 and the second storage unit 12 require less usage of the RAM and less amount of reading process in transferring encrypted data, decryption, and writing data in the flash memory 462, and thus the resources required for the processes can be reduced. Meanwhile, a smaller transfer size requires communication to be made a larger number of times, which limits raising of the communication speed.

When writing in the flash memory 462 has been completed for 32 kilobytes+α in pattern 1 where the Resume point is 32 kilobytes, the vehicle control device 10 transmits a request to the external device 20 to resume from 32 kilobytes. When the Resume size is a multiple of the encryption size, the external device 20 or the update program distributing unit 30 can specify the ciphertext of the update program by only referring to the address in the resume request. When the Resume size is not a multiple of the encryption size, the ciphertext immediately before the Resume point needs to be specified, and this disadvantageously makes the process complicated.

In pattern 2 in which the transfer size of the communication path is large as in Ethernet, the transfer size "a", the encryption size "a÷m", and the writing size "a÷m×n" are in integral multiple relationship among each other, and the transfer size is larger than the encryption size. In this case, the Resume size may be "a÷m×n×k". Specifically, the sizes are: transfer size "a"=1280 bytes, encryption size "a÷m"=16 bytes, writing size "a÷m×n"=256 bytes, and Resume size "a÷m×n×k"=16 kilobytes.

In pattern 2, the first storage unit 11 and the second storage unit 12 require more usage of the RAM and more amount of reading process in transferring encrypted data, decryption, and writing data in the flash memory 462, and thus the resources required for the processes increase. Meanwhile, a larger transfer size requires communication to be made a smaller number of times, which enables raising of the communication speed.

The present embodiment employs these patterns. Since the encryption size is limited due to the size that can be designated in block cipher (64 bits, 128 bits, etc.), determining the encryption size and the unit of writing in the flash memory 462 without limitation deteriorates the efficiency of processes. In this regard, the present invention proposes to use recommended values for the encryption size, the decryption size, and the writing size in the flash memory 462 based on the transfer size of the communication path.

In the present embodiment, the transfer size, the encryption size, and the writing size are appropriately determined to perform the processes efficiently. However, as in the above-described patterns 1 and 2, the relationship with the Resume size of the program to be updated may be determined in addition to the transfer size, the encryption size, and the writing size. That is, the Resume size is preferably an integral multiple of the writing size in the flash memory 462 and also an integral multiple of the encryption size.

As described above, according to the embodiment of the present invention, the update program distributing unit 30 encrypts the update program by the predetermined unit of encryption and transmits the encrypted update program by the predetermined unit of transfer to the vehicle control device 10 to be updated, and the vehicle control device 10 decrypts the received update program by the unit of encryption and stores the decrypted update program by the predetermined unit of writing in the program storage unit 13. Since the unit of writing is an integral multiple of the unit of encryption, the size required for the temporary storage area in the vehicle control device 10 can be reduced. In addition, since data is written by an amount corresponding to the writing size in the program storage unit 13, there is no extra process in writing in the program storage unit 13 constituted with the flash memory 462, and thus the deterioration in the process capability of the vehicle control device 10 can be suppressed.

In addition, since the unit of transfer is an integral multiple of the unit of encryption or the unit of encryption is an integral multiple of the unit of transfer, the update program can be transferred over various networks.

In addition, the vehicle control device 10 includes the first storage unit 11 that stores the update program that has been encrypted and transferred, the code decrypting unit 452 that decrypts the update program stored in the first storage unit 11, and the second storage unit 12 that stores the divided update program obtained by decryption performed by the code decrypting unit 452, so that buffering performed before and after the decryption process can adjust the amount of data processed at a time by the unit of transfer of the update program distributing unit 30 and the unit of storing in the program storage unit 13.

In addition, the program storage unit 13 includes two program storage areas 131 and 132 of the same size and the vehicle control device 10 executes the program stored in one of the program storage areas and stores the divided update program stored in the second storage unit 12 in the other one of the program storage areas, so that the program can be updated without stopping the operation of the vehicle control device 10.

In addition, the resume size as a unit of resuming the transfer of the program is determined for a case when the transfer of the program from the update program distributing unit 30 to the vehicle control device 10 fails halfway. The resume size is an integral multiple of the unit of writing, so that the ciphertext of the update program to be transferred again can be specified by only referring to the address of the resume point in the resume request.

Note that the present invention is not limited to the above-described embodiments, and includes various modifications and equivalent configurations within the spirit of the appended claims. For example, the above-described embodiments have been described in detail for easy understanding of the present invention, and the present invention is not necessarily limited to those having all the described configurations. Further, a part of the configuration of an embodiment may be replaced with a configuration of a different embodiment. Further, a configuration of a different embodiment may be added to the configuration of an embodiment. In addition, for each embodiment, a part of a configuration may be eliminated or replaced with a configuration of a different embodiment, or a configuration of a different embodiment may be added.

In addition, a part or all of the above-described configurations, functions, processing units, processing means, and the like may be realized by hardware by, for example, designing with an integrated circuit, or may be realized by software by a processor interpreting and executing a program for realizing the functions.

Pieces of information including those of a program, a table, and a file for realizing the functions can be stored in a storage device such as a memory, a hard disk, a solid state drive (SSD), and the like or a recording medium such as an IC card, an SD card, a DVD, a BD, and the like.

In addition, control lines and information lines that are considered to be necessary for description are illustrated, but this does not mean that all the control lines and information lines necessary for implementation are illustrated. In practice, it may be considered that almost all the configurations are mutually connected.

REFERENCE SIGNS LIST 10 vehicle control device
11 first storage unit
12 second storage unit
121 divided update program
13 program storage unit
131 first program storage unit
132 second program storage unit
20 external device (relay unit)
30 update program distributing unit
41 power source
42 arithmetic unit
43 communication unit
44 determination unit
45 volatile memory
451 program temporary storage unit
452 code decrypting unit
453 program update processing unit
46 non-volatile memory
461 unrewritable area
462 flash memory
50 power feeding device

The invention claimed is:

1. A program update system configured to distribute an update program from an update program distributing unit to a vehicle control device, wherein
the update program distributing unit, implemented by hardware or a processor, configured to encrypt an update program by a predetermined unit of encryption, and transmit the update program, which has been encrypted, by a predetermined unit of transfer to the vehicle control device to be updated,
the vehicle control device, implemented by hardware or a processor, configured to decrypt the received update program by the unit of encryption, and store the update program, which has been decrypted, by a predetermined unit of writing in a program storage,
the unit of writing is an integral multiple of the unit of encryption, and
wherein
the vehicle control device includes
a first storage that stores the update program that has been encrypted and transferred,
a code decrypting unit configured to decrypt the update program stored in the first storage, and
a second storage that stores a divided update program obtained by decryption performed by the code decrypting unit.

2. The program update system according to claim 1, wherein
the unit of transfer is an integral multiple of the unit of encryption.

3. The program update system according to claim 1, wherein
the unit of encryption is an integral multiple of the unit of transfer.

4. The program update system according to claim 1, wherein
the program storage includes two program storage areas of a same size, and
the vehicle control device is configured to execute a program stored in one of the program storage areas and store the divided update program stored in the second storage in another one of the program storage areas.

5. The program update system according to claim 1, wherein
a resume size as a unit of resuming transfer of a program is determined for a case when transfer of a program from the update program distributing unit to the vehicle control device fails halfway, and
the resume size is an integral multiple of the unit of writing.

6. A vehicle control device, implemented by hardware or a processor, to which an update program is distributed from an update program distributing unit, implemented by hardware or a processor, wherein
an update program encrypted by a predetermined unit of encryption by the update program distributing unit is received by a predetermined unit of transfer,
the received update program is decrypted by the unit of encryption and stored by a predetermined unit of writing in a program storage unit,
the unit of writing is an integral multiple of the unit of encryption,
a first storage that stores the update program that has been encrypted and that has been transferred to the vehicle control device,
a code decrypting unit configured to decrypt the update program stored in the first storage, and
a second storage that stores a divided update program obtained by decryption performed by the code decrypting unit.

7. A program update method for a program update system that distributes an update program from an update program distributing unit to a vehicle control device, the program update method comprising:
the update program distributing unit, implemented by hardware or a processor, encrypting the update program by a predetermined unit of encryption, and transmitting the update program, which has been encrypted, by a predetermined unit of transfer to the vehicle control device to be updated, and
the vehicle control device, implemented by hardware or a processor, decrypting the received update program by the unit of encryption, and storing the update program, which has been decrypted, by a predetermined unit of writing in a program storage, wherein
the unit of writing is an integral multiple of the unit of encryption;
a first storage of the vehicle control device storing the update program that has been encrypted and transferred,
a code decrypting unit of the vehicle control device decrypting the update program stored in the first storage, and a second storage of the vehicle control device storing a divided update program obtained by decryption performed by the code decrypting unit.

* * * * *